Aug. 7, 1945.   J. M. BOWEN ET AL   2,381,202
ADJUSTABLE GAUGE WHEEL SUPPORT
Filed Nov. 28, 1944
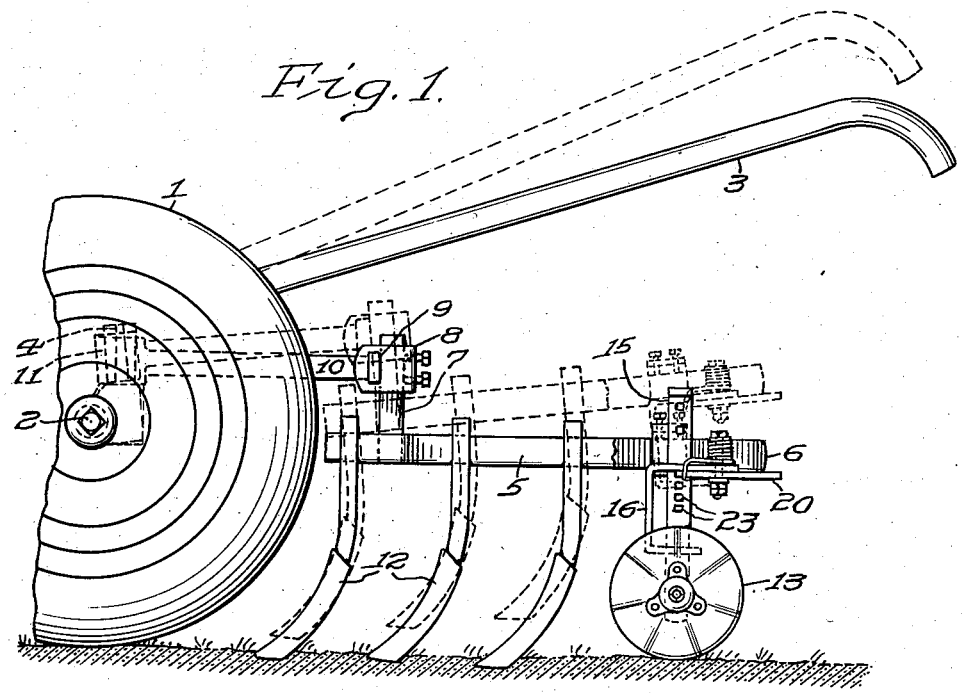
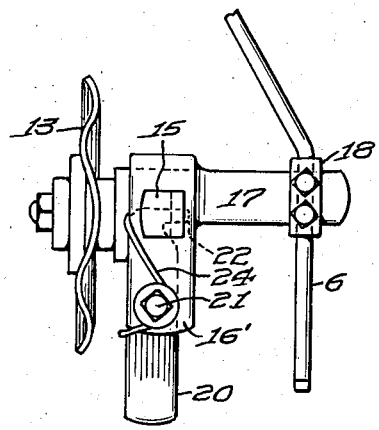
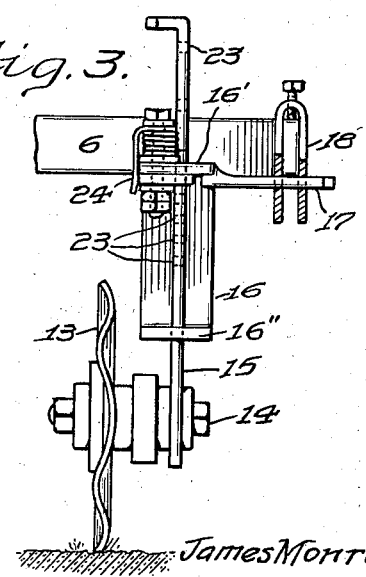
INVENTORS
James Monroe Bowen,
Charles J. Allen,
WITNESS
F. J. Hartman.
BY
ATTORNEY Patented Aug. 7, 1945

2,381,202

UNITED STATES PATENT OFFICE 2,381,202

ADJUSTABLE GAUGE WHEEL SUPPORT

James Monroe Bowen, Cape May Court House, and Charles J. Allen, Moorestown, N. J., assignors to S. L. Allen & Co., Inc., Philadelphia, Pa., a corporation of Pennsylvania Application November 28, 1944, Serial No. 565,471

1 Claim. (Cl. 97—189)

Our invention is directed to the provision of improved means for adjusting the height of the gauge wheels of a garden tractor or the like with respect to its tool carrying gang bars.

Such tractors, especially in the smaller types, normally comprise a pair of ground wheels with an axle extending therebetween on which is supported a frame carrying the driving motor and from which upwardly and rearwardly extend the handles by which the tractor is guided, the frame and handles being thus movable as a unit in a vertical plane about the center of the axle. On the frame or axle midway between the wheels is located a king bolt over which a vertically elongated eye at the front end of the tool carrying gang assembly is hooked and more or less adjacent the rear end of the gang bars comprised therein are disposed gauge wheels which support the rear end of the assembly and determine the spacing of the gang bars from the ground, the cultivating tools normally being secured to the bars forwardly of these wheels and thus between them and the axle. Consequently by increasing or decreasing the distance between the axes of the gauge wheels and the superjacent gang bars the cultivating tools can be caused to enter the ground to a greater or less degree without changing their respective vertical adjustment on the bars or even caused to clear the ground entirely as when the tractor is being moved to or from the place at which it is to be used.

Hitherto the standards near the bottoms of which the gauge wheels are supported either have been clamped rigidly to the bars thus requiring the loosening and re-tightening of the clamps to change the distance between the bars and wheels or in lieu of clamps some means designed to facilitate this adjustment has been provided, but as far as we are aware all such means have been open to various objections under practical conditions of operation or have been so complicated and expensive to manufacture as to be unsatisfactory.

The principal object of our invention therefore is the provision of improved means through the medium of which the height of the gang bars with relation to the gauge wheels can be adjusted with maximum convenience and without the necessity of using a wrench to loosen or tighten clamps or other like devices, yet which are extremely simple in construction, do not materially add to the cost of the tractor as a whole and which are effective to positively maintain the desired adjusted relation between the wheels and gang bars once the parts have been brought thereto.

Other objects and novel features of design, construction and arrangement comprehended by the invention are hereinafter more particularly mentioned or will be apparent to those skilled in the art from the following description of one form of the invention as illustrated in the accompanying drawing.

Since the invention is of particular utility in connection with a garden tractor of the character to which general reference has been made we shall describe it in association with such tractor but not by way of limitation or restriction of the invention thereto as it may be employed with advantage with other agricultural implements and the like.

In the said drawing,

Fig. 1 is a side view of a garden tractor equipped with the invention with parts of the tractor proper shown in a conventional manner;

Fig. 2 is a fragmentary plan view on a larger scale of a portion of one of the tractor gang bars and gauge wheel assembly; and Fig. 3 is a rear elevation thereof, like characters of reference being used to designate the same parts in the several figures.

Referring first to Fig. 1, the tractor comprises the customary ground wheels 1, axle 2, rearwardly extending divergent handles 3 and a vertically extending king bolt 4 supported on the axle or some convenient portion of the frame (not shown). In general the gang assembly, which is detachable from the tractor, includes a pair of rearwardly extending laterally spaced gang bars 5, 6 near the front end of each of which is a vertical standard 7 adjustably secured as by a clamp 8 to a transversely extending bar from which a pair of inwardly converging bars 10 project to meet in a socket 11 which is hooked over the king bolt when the gang is operatively associated with the tractor, the cultivating or other tools 12 being removably secured to bars 5, 6 at longitudinally spaced intervals by suitable clamping means (not shown). Adjacent and below the rear end of each of the gang bars 5, 6 is located a gauge wheel 13, that shown in the drawing being associated with the right hand gang bar on the far side of the machine, bar 5 on the near side being broken away and the gauge wheel normally associated therewith being omitted entirely for convenience of illustration. These wheels are customarily fluted and afford support to and also steady the rear end of the gang assembly when the tractor is in operation. It will be appreciated that the various parts of which mention has just been made are commonly found in garden tractors but as they form no part of the present invention their specific design and arrangement is a matter of choice.

We shall now refer more particularly to the manner in which, in accordance with our invention, we arrange these wheels for adjustment with respect to the gang bars to which they are operatively attached, and as the means employed are similar for each wheel a description of one of the assemblies will apply equally to the other. Thus, each wheel is rotatably mounted on a transversely extending axle 14 in any convenient way and the axle is rigidly secured to the lower end of an upwardly projecting standard 15 which in turn is removably secured to the adjacent gang bar in the manner now to be described. Standard 15 is preferably made of a flat bar with its longer transverse dimension disposed at right angles to axle 14 and thus when assembled with the gang lying parallel to the longitudinal axis of the tractor as a whole, and above the axle it passes slidably through appropriate slots in the arms of a generally U-shaped yoke 16 normally so positioned that the free ends of its arms project in a generally rearward direction. This yoke is likewise desirably made of flat stock and its bridge portion extending between its upper and lower arms 16', 16" is made long enough to space the arms sufficiently to afford adequate support to the standard which, as stated, slidably passes through them. To the upper arm is welded or otherwise suitably secured a laterally extending wing 17 through the medium of which the yoke and parts carried thereby can be removably attached to the gang bar, in this instance gang bar 6, as by a clamp 18 of appropriate design. In the drawing one wheel carrying assembly is shown attached to bar 6 in such manner that the wheel lies inside the bar and of course the other assembly is correspondingly attached to bar 5, but it will be apparent that if it is desired to locate the gauge wheels outside the bars instead of inside the respective assemblies can readily be transposed from one bar to the other so that wings 17 will project inwardly rather than outwardly.

A lever 20 is pivotally supported on upper yoke arm 16' for movement in a plane normal to that in which standard 15 extends, the lever being preferably disposed beneath the arm and arranged for rotation about a pivot bolt 21 extending through the lever and the arm. The operating end of the lever projects outwardly beyond the arm for a suitable distance and, as best shown in Fig. 2, its inner end is formed to provide a dog 22 adapted to enter any of a series of holes 23 in the standard, these holes being arranged at spaced intervals and being preferably substantially rectangular in shape with the dog suitably contoured to freely engage in them. A spring 24 is coiled about the upper portion of the bolt and arranged, also as best shown in Fig. 2, to constantly bias the lever in a direction to yieldingly force the dog toward the standard and to enter it in any of the holes when aligned with it. Thus by moving the outer end of the lever, that is, the end opposite that at which the dog is disposed, the dog can be retracted from any hole in the standard in which it may be engaged and the standard and yoke then slid relatively to each other to effect a desired adjustment, after which release of pressure on the outer end of the lever enables the latter under the bias of the spring to enter the dog in whatever hole is aligned therewith and thus positively yet releasably lock the standard to the yoke in the adjusted position.

It will therefore be apparent that when wing 17 is clamped to the gang bar of the tractor, the distance between the gauge wheels and bars may be very readily varied by retracting the dog from the standard by suitable movement of the lever and then sliding the bar and yoke in either direction on the standard until the wheel occupies the desired relation thereto, after which by merely releasing the lever the dog will automatically enter whichever one of the holes in the standard is aligned therewith and thus lock the parts in the adjusted position. Now since the depth the cultivating tools 12 enter the ground after they are secured to the gang bars in proper position is largely determined, within limits, by the distance between the gauge wheel axles and the bars, it is a very simple matter to vary this distance in the manner just described and thus cause the points of the tools to enter the ground more or less deeply as desired. Preferably, therefore, the holes in the standard are arranged approximately as indicated in the drawing, that is, a series of rather closely spaced ones are provided about midway between the ends of the standard so that by moving the dog from one hole to another in this group a relatively fine adjustment can be secured, while another hole is placed near the top of the standard and used when it is desired to lift the tools entirely clear of the ground as indicated in dotted lines in Fig. 1 to enable the tractor to be moved about on its wheels from place to place without the tools contacting the ground. Preferably, also, the upper extremity of the standard is turned over (Fig. 3) to limit the movement of the yoke and prevent its upper arm being accidentally disengaged from the standard.

When making the required adjustments of the gauge wheels the levers 20 may be actuated by hand or frequently very conveniently by the operator's foot, while of course by merely lifting the handles of the tractor when the levers are held in non-locking position the whole gang assembly may be raised relatively to the gauge wheels to the dotted line position of Fig. 1 and the levers then permitted to snap back and engage their dogs in the upper holes of the standard to maintain the gang at a sufficient height to hold the tools off the ground.

Under conditions of practical operation it has been found that the invention is of great utility and a decided improvement over any of the devices with which we are familiar heretofore proposed for a like purpose. The parts are simple, can be of rugged construction, are not liable to break or get out of order when in use and can be rapidly and effectively manipulated in the field.

It will of course be appreciated that while we have herein described and illustrated one form of the invention with considerable particularity, we do not thereby desire or intend to specifically limit or restrict ourselves thereto as the design, construction and method of assembly of the various instrumentalities employed may be varied in numerous particulars if desired within the scope of the appended claim.

Having thus described our invention, we claim and desire to protect by Letters Patent of the United States:

A gauge wheel assembly adapted for securement to a tractor gang bar or the like and comprising a vertical yoke composed of upper and lower horizontal arms having vertically aligned slots and a vertical connecting portion, said yoke being provided at the top with a rigid, laterally extending wing carrying a terminal clamp engageable with said gang bar and adjustable along the same, said wing offsetting the yoke laterally from the gang bar, a standard slidable in the slots of the arms of the yoke and provided with spaced holes and having an axle at its lower end, a gauge wheel mounted on the axle, and a horizontal spring actuated lever pivotally mounted on one of the arms of the yoke and provided at one end with a dog engaging one of the holes of the standard, the other end of the lever projecting beyond the yoke and forming a handle.

JAMES MONROE BOWEN.
CHARLES J. ALLEN.